US012134106B2

(12) United States Patent
Puzycki

(10) Patent No.: US 12,134,106 B2
(45) Date of Patent: Nov. 5, 2024

(54) LIQUID APPLICATOR APPARATUS AND ASSOCIATED METHOD OF USING THE SAME

(71) Applicant: Barbara Puzycki, Holland, MI (US)

(72) Inventor: Barbara Puzycki, Holland, MI (US)

( * ) Notice: Subject to any disclaimer, the term of this patent is extended or adjusted under 35 U.S.C. 154(b) by 320 days.

(21) Appl. No.: 17/532,116

(22) Filed: Nov. 22, 2021

(65) Prior Publication Data

US 2023/0158536 A1 May 25, 2023

(51) Int. Cl.
*B05C 1/16* (2006.01)
*B05C 17/02* (2006.01)

(52) U.S. Cl.
CPC .......... *B05C 1/165* (2013.01); *B05C 17/0212* (2013.01); *B05C 17/0227* (2013.01); *B05C 17/0232* (2013.01)

(58) Field of Classification Search
CPC ......... B05C 1/027; B05C 1/165; B05C 17/02; B05C 17/0212; B05C 17/0227; B05C 17/0232
USPC ...................................................... 15/230.11
See application file for complete search history.

(56) References Cited

U.S. PATENT DOCUMENTS

| | | | |
|---|---|---|---|
| 2,538,241 | A | 1/1951 | Guimond |
| 2,680,873 | A | 6/1954 | Ernst |
| 2,685,100 | A | 8/1954 | Schaefer |
| 2,735,128 | A | 2/1956 | Adams |
| 2,813,292 | A | 11/1957 | McLendon |
| 2,929,089 | A | 3/1960 | Nall |
| 2,994,899 | A | 8/1961 | Moilanen |
| 3,159,905 | A | 12/1964 | Baggett, Jr. |
| 3,358,312 | A | 12/1967 | Parr |
| 3,562,837 | A | 2/1971 | Baginski et al. |
| 3,649,986 | A | 3/1972 | Dahlund |
| 3,662,422 | A | 5/1972 | Christensen et al. |
| 3,714,674 | A | 2/1973 | Simoncioni |
| 4,000,537 | A | 1/1977 | Woo |
| 4,106,434 | A | 8/1978 | Vines |
| 4,197,338 | A | 4/1980 | Perna |
| 4,320,553 | A | 3/1982 | Charles |
| 4,335,484 | A | 6/1982 | Ridge et al. |
| 4,644,604 | A | 2/1987 | Kierce |
| 4,815,604 | A | 3/1989 | O'Neil et al. |
| 5,035,022 | A | 7/1991 | Iuliano et al. |
| D328,808 | S | 8/1992 | Goetz |
| 5,269,039 | A | 12/1993 | Isaac |
| 5,339,484 | A | 8/1994 | Polzin et al. |
| 5,473,791 | A | 12/1995 | Holcomb et al. |
| 5,713,095 | A | 2/1998 | Wakat |
| D403,866 | S | 1/1999 | Lapre |
| 6,238,740 | B1 | 5/2001 | Janssen |
| 7,090,421 | B1 * | 8/2006 | Mead ................. B05C 17/0232 401/266 |
| 7,509,703 | B2 | 3/2009 | Martin |
| 10,646,895 | B2 * | 5/2020 | Burns ................ B05C 17/0217 |

(Continued)

*Primary Examiner* — Randall E Chin
(74) *Attorney, Agent, or Firm* — King & Partners, PLC

(57) ABSTRACT

A liquid applicator apparatus that allows for simultaneous application of a liquid to a plurality of surfaces, including: a handle member; an applicator retaining member; a first liquid applicator; a second liquid applicator; and wherein the first liquid applicator and second liquid applicator are adapted to enable a user to simultaneously apply a liquid to noncontinuous and/or nonplanar surfaces.

11 Claims, 10 Drawing Sheets

(56) References Cited

U.S. PATENT DOCUMENTS

| | | | | |
|---|---|---|---|---|
| 2003/0074760 | A1 * | 4/2003 | Keller | B05C 17/0207 492/19 |
| 2003/0217427 | A1 * | 11/2003 | Martin | B05C 17/0212 15/230.18 |
| 2005/0034261 | A1 * | 2/2005 | Capoccia | B05C 17/0207 492/19 |
| 2019/0099778 | A1 * | 4/2019 | Antoniazzi | B05C 17/0212 |

* cited by examiner

LIQUID APPLICATOR APPARATUS AND ASSOCIATED METHOD OF USING THE SAME

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to liquid applicator apparatuses, and, more particularly, those used in the application of liquids (e.g., paints, stains, varnishes, primers, sealants, adhesives, caulks, coatings, texture modifiers, etcetera) that enable a user to apply a liquid to noncontinuous and/or nonplanar surfaces, that are ordinarily difficult to reach, in a fast, accurate, precise, efficient and convenient manner. The liquid applicator apparatuses of the present invention are especially well-suited for painting and/or staining, for example, decks, patios, lanais, shiplap, Dutch lap, numerous types of siding, board and batten surfaces, segmented concrete, and brick and mortar surfaces—just to name a few.

2. Background Art

Liquid applicator apparatuses and/or rollers have been known in the art for years and are the subject of several patents and publications, including: U.S. Pat. No. 7,509,703 entitled "Roller Hub with Cover and Loading Device," U.S. Pat. No. 5,713,095 entitled "Bifurcated Paint Roller and Painting Method," U.S. Pat. No. 5,473,791 entitled "Paint Roller and Tray Apparatus," U.S. Pat. No. 5,339,484 entitled "Closed End Paint Roller and Method of Manufacture Thereof," U.S. Pat. No. 4,197,338 entitled "Dry Wall-Board Surface Finishing," U.S. Pat. No. 4,000,537 entitled "Paint Roller Device Having Juxta-Posed Rollers," U.S. Pat. No. 3,662,422 entitled "Corner Paint Roller," U.S. Pat. No. 3,562,837 entitled "Paint Roller," U.S. Pat. No. 2,735,128 entitled "Paint Roller for Woven Wire Fences," and U.S. Pat. No. 2,680,873 entitled "Paint Roller"—all of which are hereby incorporated herein by reference in their entirety including all references cited therein.

U.S. Pat. No. 7,509,703 appears to disclose a liquid loading and application apparatus that includes a hub, a paint roller support element, and the hub receives the paint roller support element. The hub includes first and second frusto-conical surfaces subtending an angle, and oppositely disposed annular end surfaces contiguous with the respective first and second frusto-conical surfaces. A cover of a first material conforms to the frusto-conical surfaces. The cover has opposed circular openings, and elastic strips of a second material. The elastic strips engage the frusto-conical surfaces and grippingly secure the cover to the hub. The first material is more elastic than the second material so that the strips grippingly secure the cover to the hub.

U.S. Pat. No. 5,713,095 appears to disclose a bifurcated paint roller and method of painting. The paint roller is a hand tool having two roller portions, wherein each of the roller portions include a nap for picking up and spreading paint. The roller portions are spaced transversely from each other and rotate independently of the other. A paint pan is provided with the bifurcated paint roller and is itself bifurcated. The paint pan includes two receptacle portions, each of which holds a paint having a different characteristic. A divider separates the receptacle portions such that the paints having the different characteristics are prevented from mixing. The distal end of the hand tool includes an open-ended slot for reception of the divider such that each of the roller portions is dippable into their respective paints. Alternatively, the hand tool may include tubes mounted thereon and feeding paint to the roller portions. The painting method includes the steps of applying a paint having a first characteristic to a surface, rolling the roller portions with paint having respective second and third characteristics across the surface, and pressing and removing a plastic sheeting to the surface immediately after either or both of the painting steps. The hand tool and method provide a quick and easy way of achieving an effect identical to sponge or rag painting. Especially preferred for the first characteristic is a texture, and especially preferred for the second and third characteristics are second and third micaceous materials to achieve mixed pearlescent effects.

U.S. Pat. No. 5,473,791 appears to disclose a roller and tray apparatus that includes a roller assembly which includes a handle portion, a bearing portion connected to the handle portion, and a replaceable porous roller portion connected to the bearing portion. The roller portion includes a first canted peripheral edge adapted to contact a first interior surface adjacent to an interior corner without contacting a second interior surface adjacent to the interior corner. A tray assembly includes a squeeze area for receiving the roller portion for squeezing out excess coating material from the roller portion. The squeeze area includes a first canted wall portion which is complementary to the first canted peripheral edge and is adapted to squeeze excess coating material out of the roller portion. The roller portion may also include a second canted peripheral edge adapted to contact a second interior surface adjacent to the interior corner without contacting the first interior surface adjacent to the interior corner. The second canted peripheral edge and the first canted peripheral edge are juxtaposed back-to-back to each other, whereby they form an exterior corner that is complementary to the interior corner. The squeeze area of the tray assembly includes a second canted wall portion which is complementary to the second canted peripheral edge and is adapted to squeeze excess coating material out of the roller portion. The first canted wall portion and the second canted wall portion are juxtaposed to each such that they form an angled groove which is complementary to the exterior corner.

U.S. Pat. No. 5,339,484 appears to disclose a closed-end roller cover in which the pile fabric on the end, and the portion of the core to which it is secured, is integral with the main body of the cover, and a method of manufacture thereof. The cover is formed by heating the end portion of a fabric covered blank a short distance at the end, preferably along parallel lines so as to form structural lines of weakness, and immediately thereafter crimping the still pliable end portion inwardly upon itself to form a solid end wall with adhering pile fabric.

U.S. Pat. No. 4,197,338 appears to disclose an apparatus and method used in the finishing of dry wall-board surfaces at joints and outside and inside corners by applying joint compounds, taping thereover, and applying wipe-off tools for removal of excess compound applied and feathering of the tape edges either simultaneously or otherwise. The improvement of the invention comprises using a cellular or cellulosic sponge roller having an operative peripheral sleeve circular in profile and adapted to pick up and distribute said compound in the application thereof.

U.S. Pat. No. 4,000,537 appears to disclose a pair of juxta-posed rotatably mounted adjustable width rollers that include a lead roller and a drip-catching follower roller to the axles of which a handle is pivotally attached for actuating the pair of rollers from a multiplicity of handle positions to apply the paint therewith to a surface.

U.S. Pat. No. 3,662,422 appears to disclose a paint roller head that is composed of a rigid skeletal core embedded in a resilient molded plastic body having an annularly ridged periphery and a pile cover fitting snugly over and substantially completely enclosing the head. The head is demountably carried on a cantilever axle integral with the shank of a handle having one portion which extends substantially centrally radially of the head and a dogleg portion connecting such radial portion and the axle root.

U.S. Pat. No. 3,562,837 appears to disclose a paint roller assembly comprised of a pair of paint rollers carried upon ball bearings supported on a shaft, and the ball bearing being enclosed within an oil reservoir that is designed to be leakproof regardless of the position of the paint roller assembly.

U.S. Pat. No. 2,735,128 appears to disclose a roller used to paint woven wire fences by applying paint to the surfaces of the wires and to the side edges thereof in a single pass, whereby the paint roller is passed but once over the surface of the fence, at each side thereof, without any danger of making missed spots or unpainted portions on the side runs of the wires and without splashing or dripping of the paint to any objectionable extent.

U.S. Pat. No. 2,680,873 appears to disclose a paint roller with improved handle means. The handle is so disposed that it does not interfere with the painting operation. The paint roller is well balanced with reference to the handle thereon.

While the above-identified patents and publications do appear to disclose various liquid applicator apparatuses, their configurations remain non-desirous and/or problematic inasmuch as, among other things, none of the above-identified liquid applicator apparatuses appear to enable a user to simultaneously apply a liquid to noncontinuous and/or nonplanar surfaces as disclosed herein.

These and other objects of the present invention will become apparent in light of the present specification, claims, and drawings.

SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The present invention is directed to a liquid applicator apparatus that allows for fast, convenient, and simultaneous application of a liquid to a plurality of surfaces, comprising, consisting essentially of and/or consisting of: (a) a handle member; (b) an applicator retaining member; (c) a first liquid applicator; (d) a second liquid applicator; and (e) wherein the first liquid applicator and second liquid applicator are adapted to enable a user to simultaneously apply a liquid to noncontinuous and/or nonplanar surfaces, that are ordinarily difficult to reach, in a fast and convenient manner.

In a preferred embodiment of the present invention, the handle member includes a top end, a bottom end, and a gripping region positioned therebetween.

In another preferred embodiment of the present invention, the bottom end of the handle member is adapted for releasable securement to an extension pole for enabling a user to apply liquid to a surface while standing upright.

In yet another preferred embodiment of the present invention, the applicator retaining member is secured to the handle member using, for example, a universally available threaded adapter.

In one preferred embodiment of the present invention, the applicator retaining member includes a main portion, an offset portion, a spacer portion, and a mounting portion having a proximal end and a distal end.

In one preferred aspect of the present invention, the first liquid applicator and the second liquid applicator are positioned on the mounting portion of the applicator retaining member.

In a preferred embodiment of the present invention, the first liquid applicator and the second liquid applicator are rotatably displaceable about the applicator retaining member.

In another preferred embodiment of the present invention, the first liquid applicator and/or the second liquid applicator are adjustable between the proximal end and the distal end of the applicator retaining member.

In yet another preferred embodiment of the present invention, the first liquid applicator and second liquid applicator are adapted to enable a user to simultaneously apply a liquid to a noncontinuous surface and a subjacent and/or superjacent portion of a nonplanar surface.

In a preferred embodiment of the present invention, the liquid applicator apparatus further comprises a third liquid applicator. In this embodiment, the third liquid applicator is preferably adjustable between the proximal end and the distal end of the applicator retaining member.

The present invention is also directed to a liquid applicator apparatus that allows for fast, convenient, and simultaneous application of a liquid to a plurality of surfaces, comprising, consisting essentially of and/or consisting of: (a) a handle member, wherein the handle member includes a top end, a bottom end, and a gripping region positioned therebetween, and wherein the bottom end of the handle member is adapted for releasable securement to an extension pole for enabling a user to apply liquid to a surface while standing upright; (b) an applicator retaining member, wherein the applicator retaining member includes a main portion, an offset portion, a spacer portion, and a mounting portion having a proximal end and a distal end, and wherein the applicator retaining member is secured to the handle member; and (c) a first liquid applicator and a second liquid applicator, wherein the first liquid applicator and the second liquid applicator are rotatably displaceable about the applicator retaining member, and wherein at least one of the first liquid applicator and the second liquid applicator are adjustable between the proximal end and the distal end of the applicator retaining member.

The present invention is further directed to method of applying a liquid to a nonplanar surface, comprising, consisting essentially of and/or consisting of the steps of: (a) providing a surface having a primary surface and multiple secondary surfaces, wherein the secondary surfaces are positioned subjacent or superjacent to the primary surface; (b) providing a liquid applicator apparatus as disclosed herein, comprising: a handle member; an applicator retaining member; a first liquid applicator; and a second liquid applicator; (c) applying liquid to the first liquid applicator and the second liquid applicator; (d) transferring the liquid from the first liquid applicator and the second liquid applicator to a portion of the primary surface and a plurality of secondary surfaces in a single rolling application; and (e) simultaneously transferring liquid from an applicator of a conventional, single applicator roller to any remainder of the primary surface.

The present invention is yet further directed to a method of applying a liquid to a noncontinuous surface, comprising, consisting essentially of and/or consisting of the steps of: (a) providing a noncontinuous surface having a plurality of gaps and/or seams; (b) providing a liquid applicator apparatus as disclosed herein, comprising: a handle member; an applicator retaining member; a first liquid applicator; and a second liquid applicator; (c) applying liquid to the first liquid applicator and the second liquid applicator; (d) simultaneously transferring the liquid from the first liquid applicator and the second liquid applicator to a portion of the primary surface and a plurality of gaps and/or seams in a single rolling application; and (e) transferring liquid from an applicator of a conventional, single applicator roller to any remainder of the primary surface.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted.

It will be further understood that the invention is not necessarily limited to the particular embodiments illustrated herein.

Figure 1:
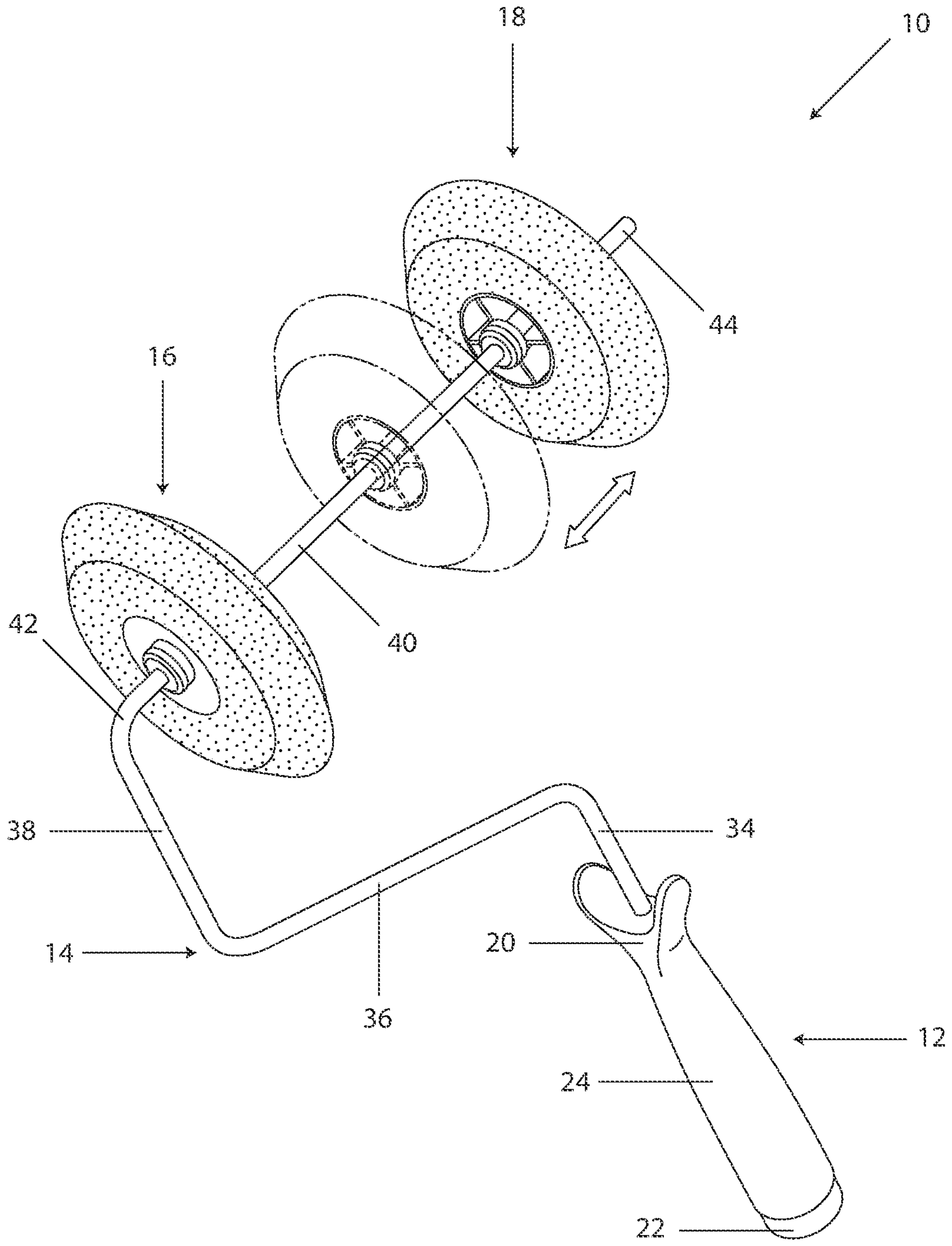
Figure 2:
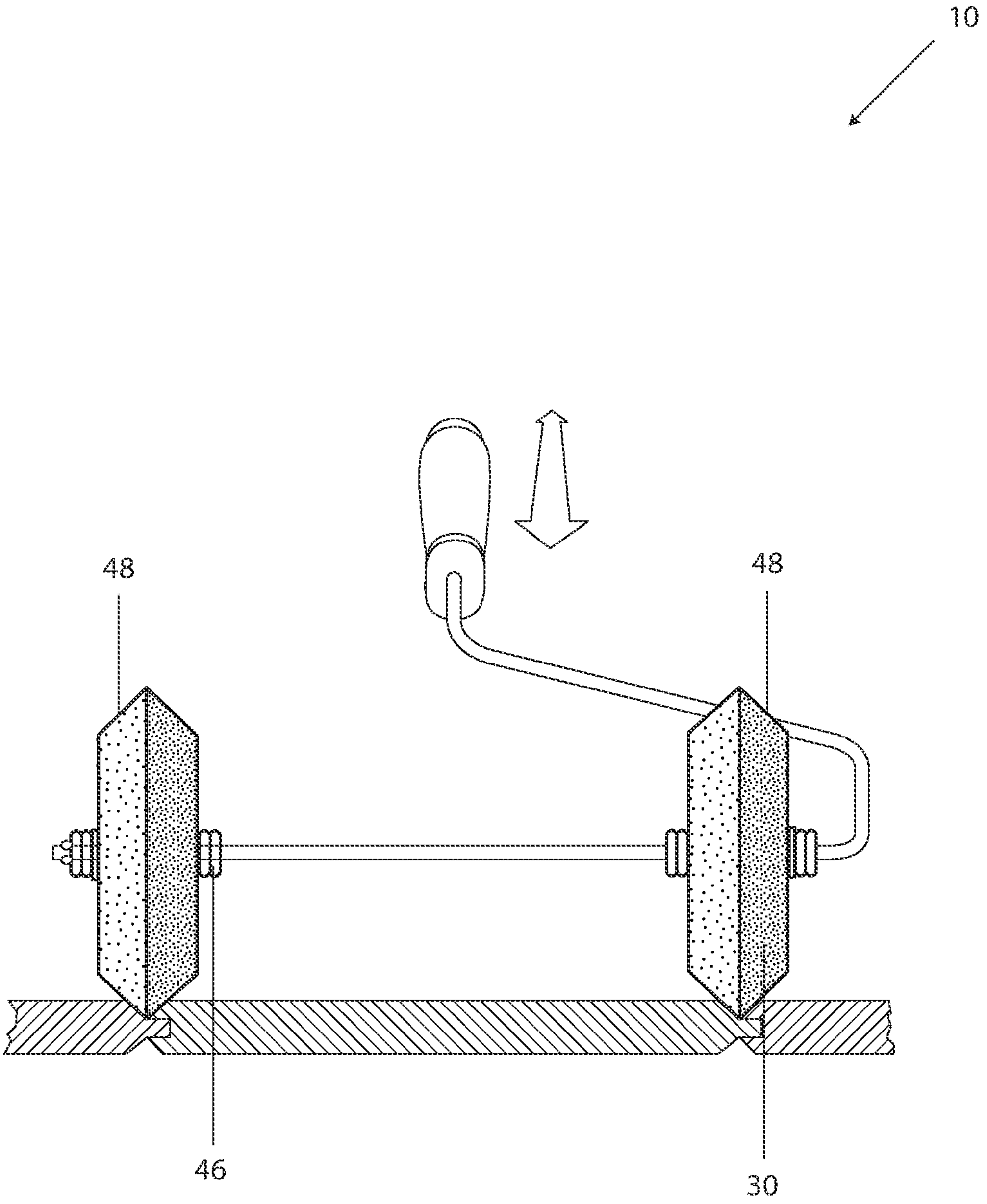
Figure 3:
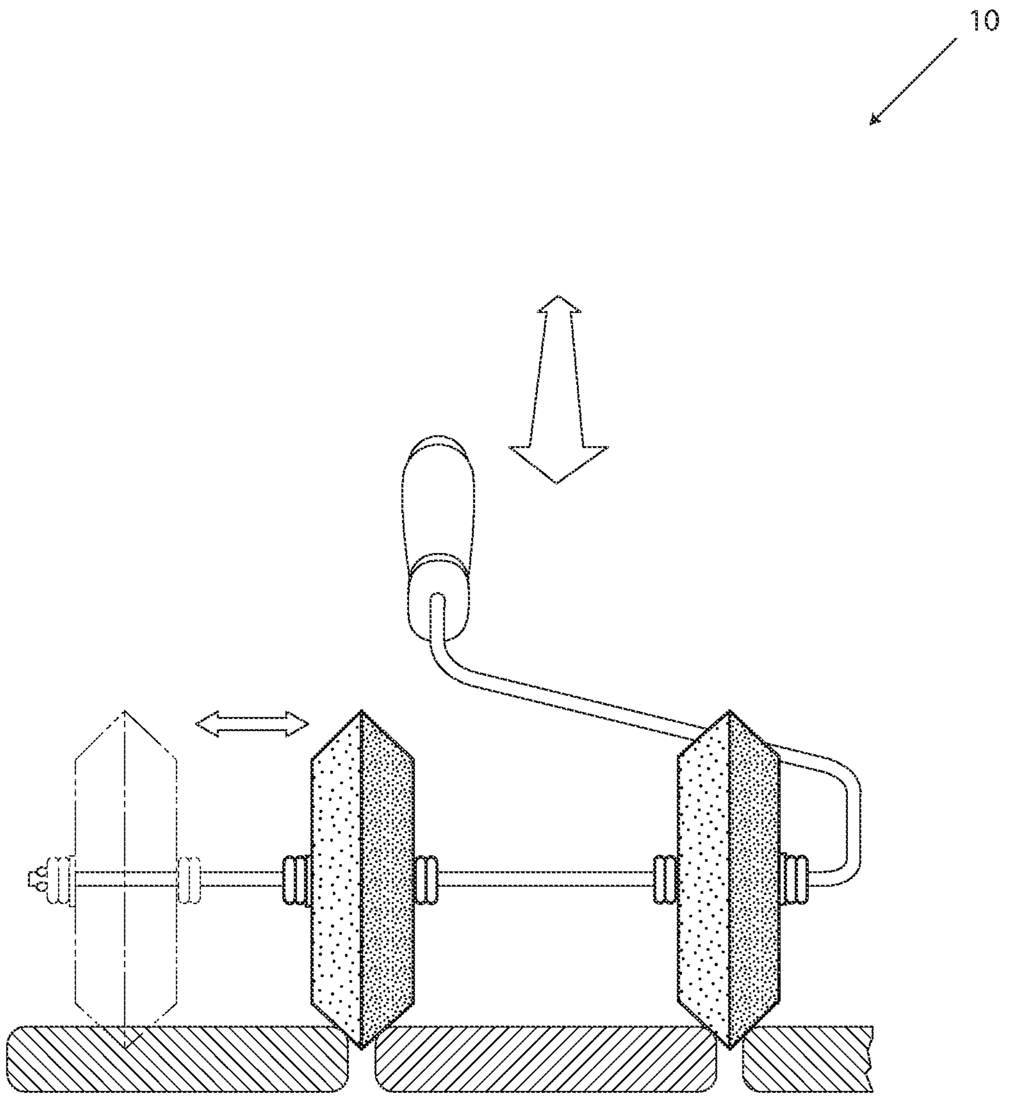
Figure 4:
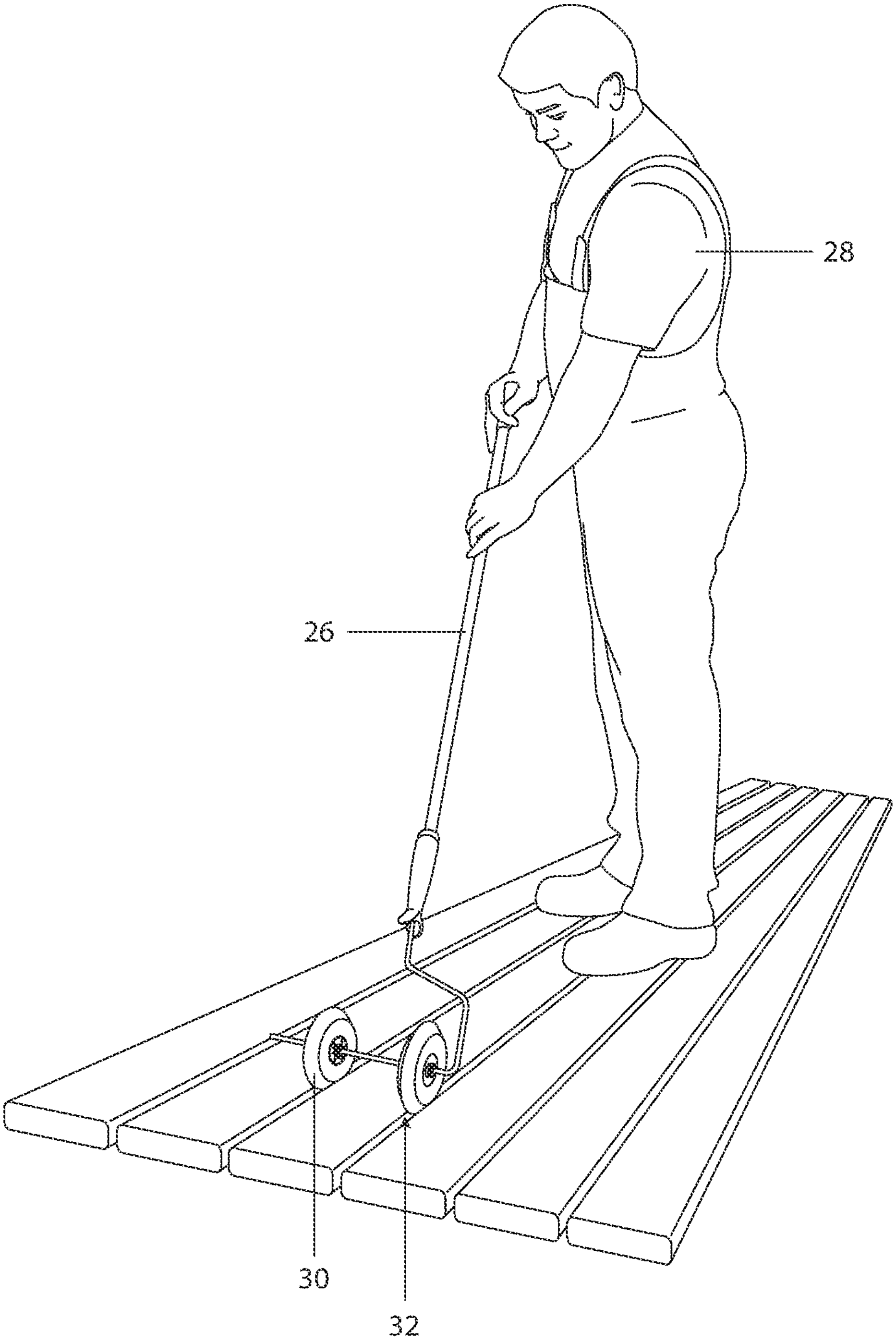
Figure 5:
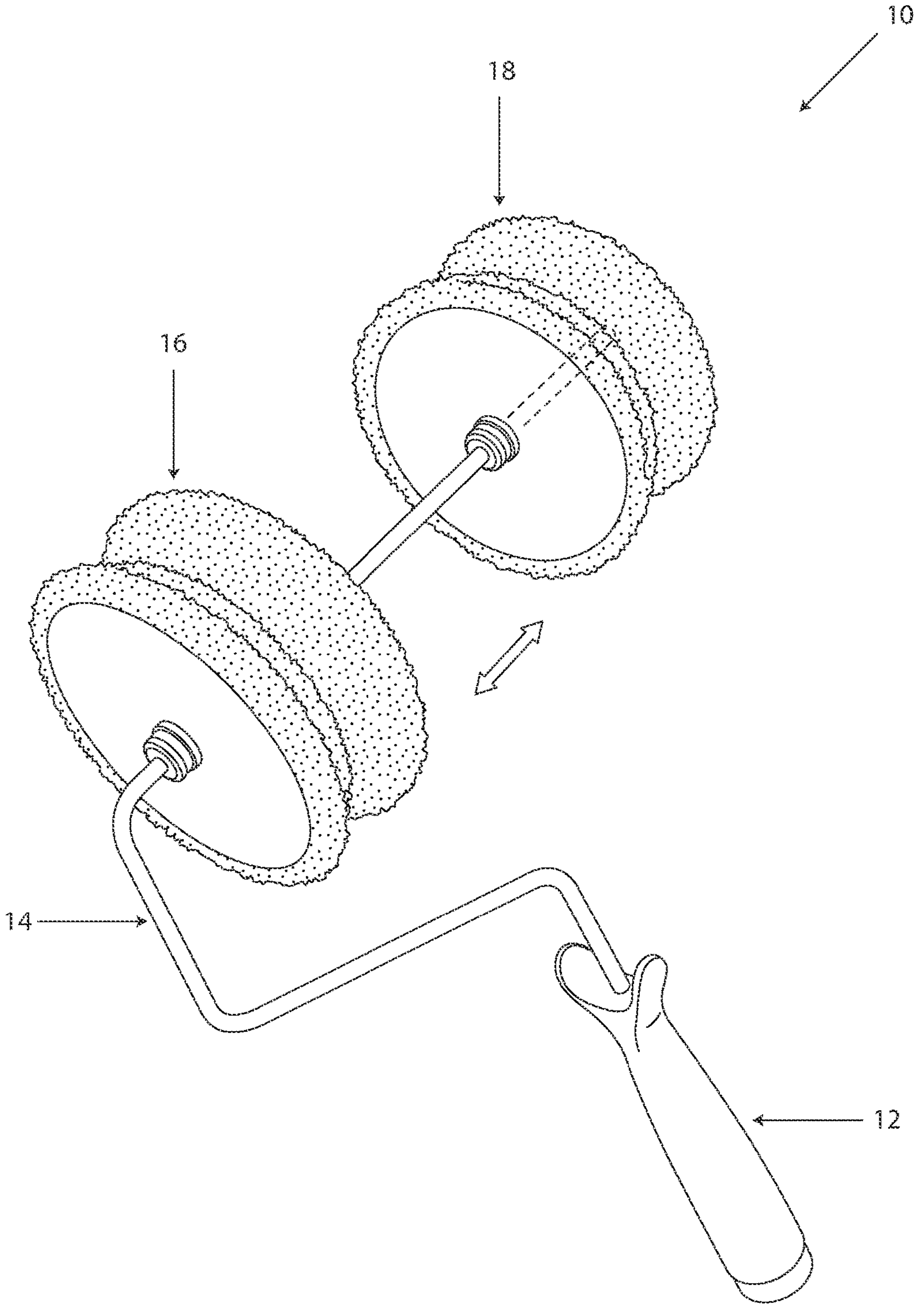
Figure 6:
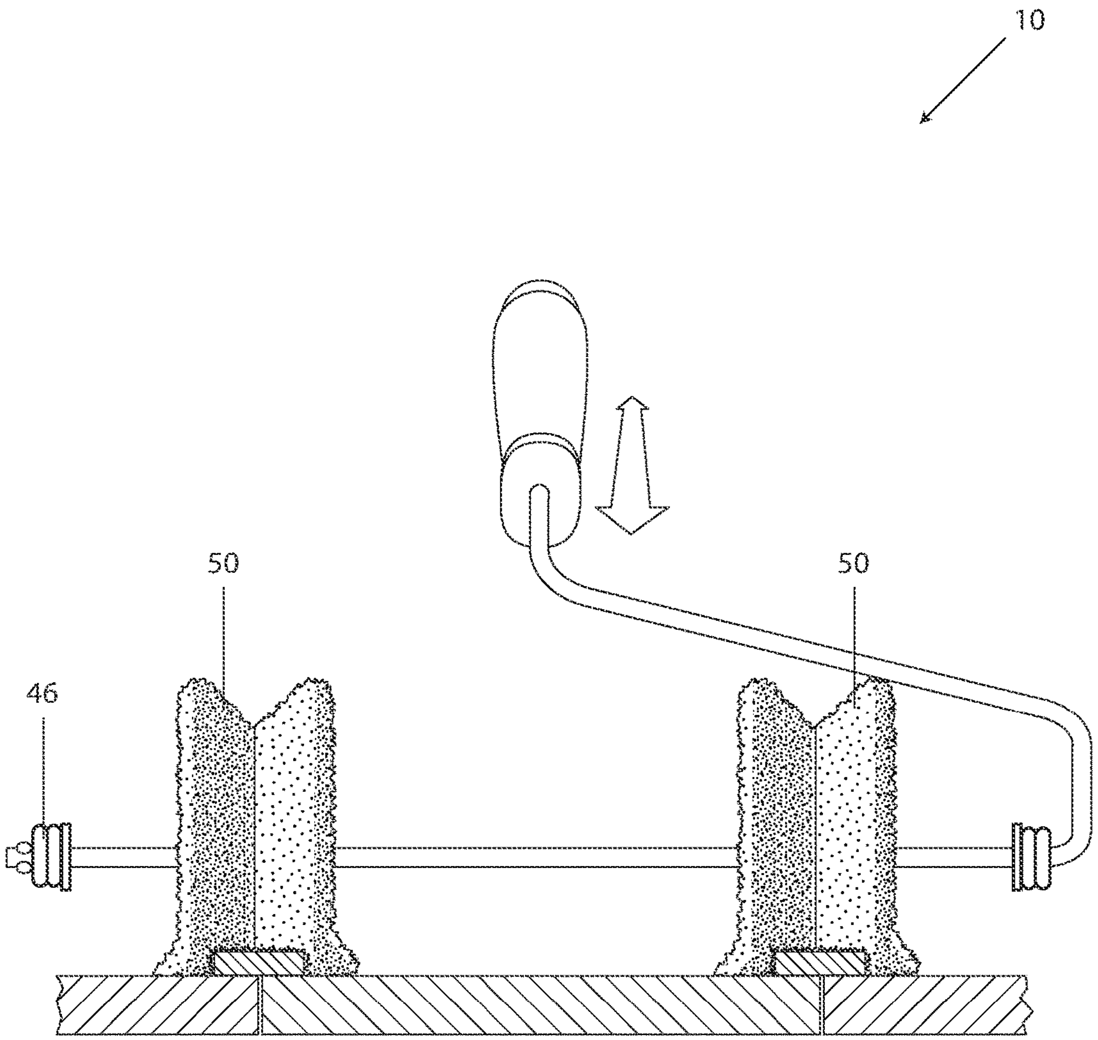
Figure 7:
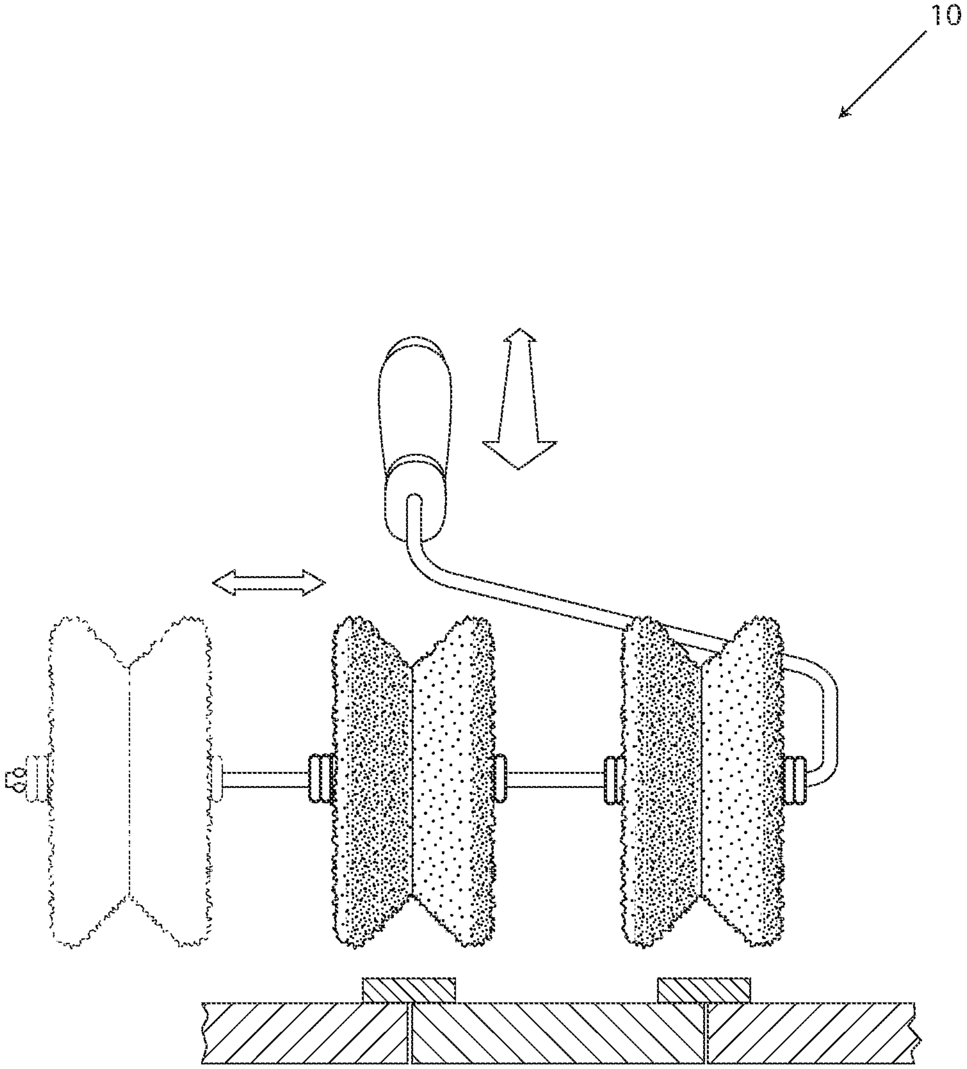
Figure 8:
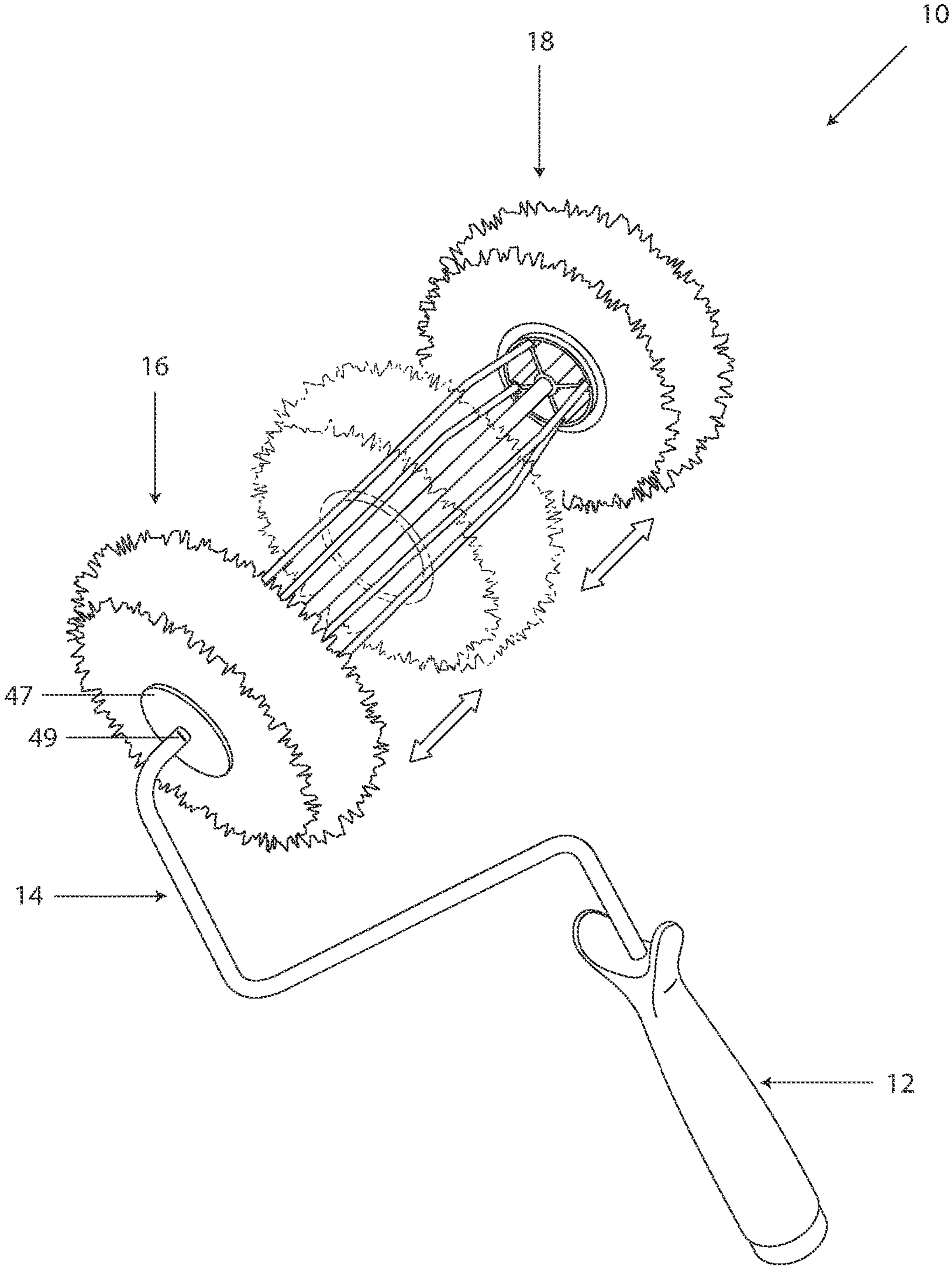
Figure 9:
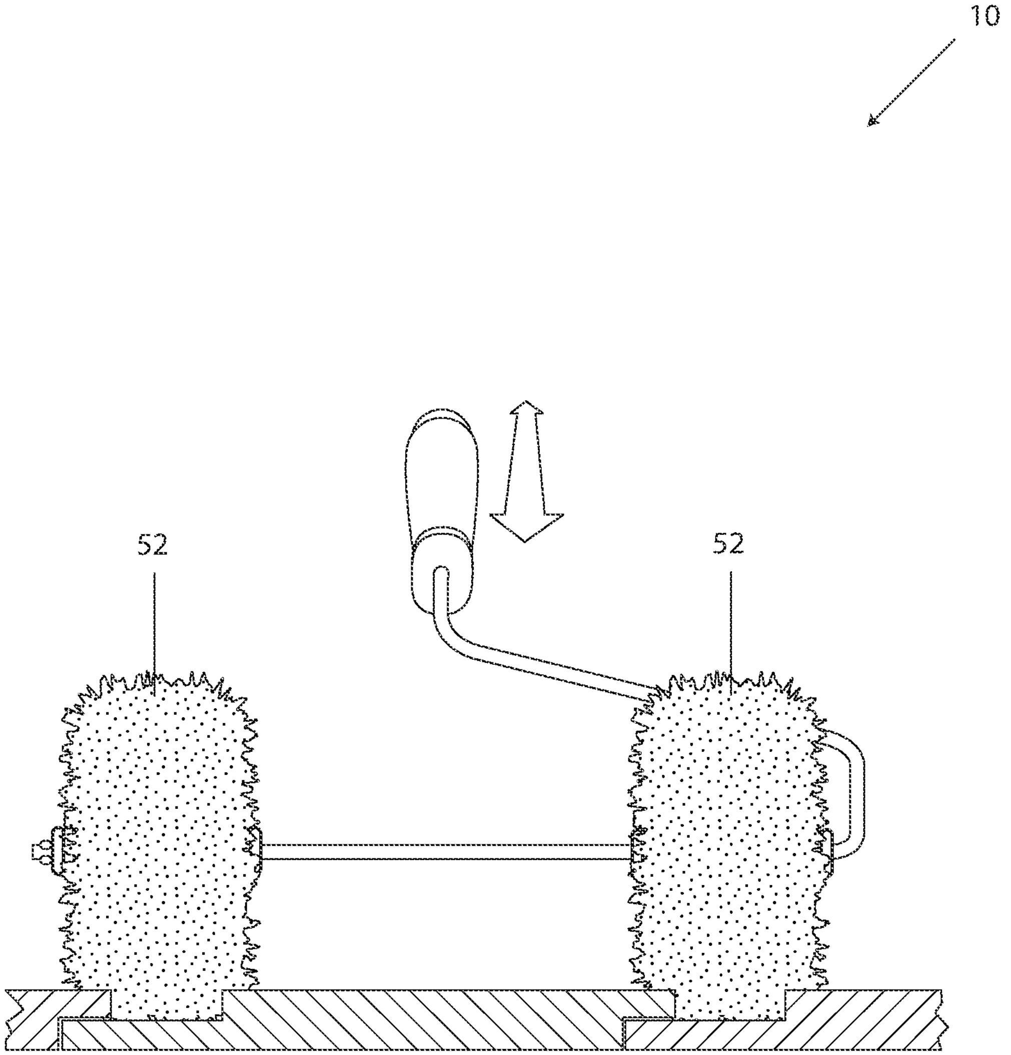
Figure 10:
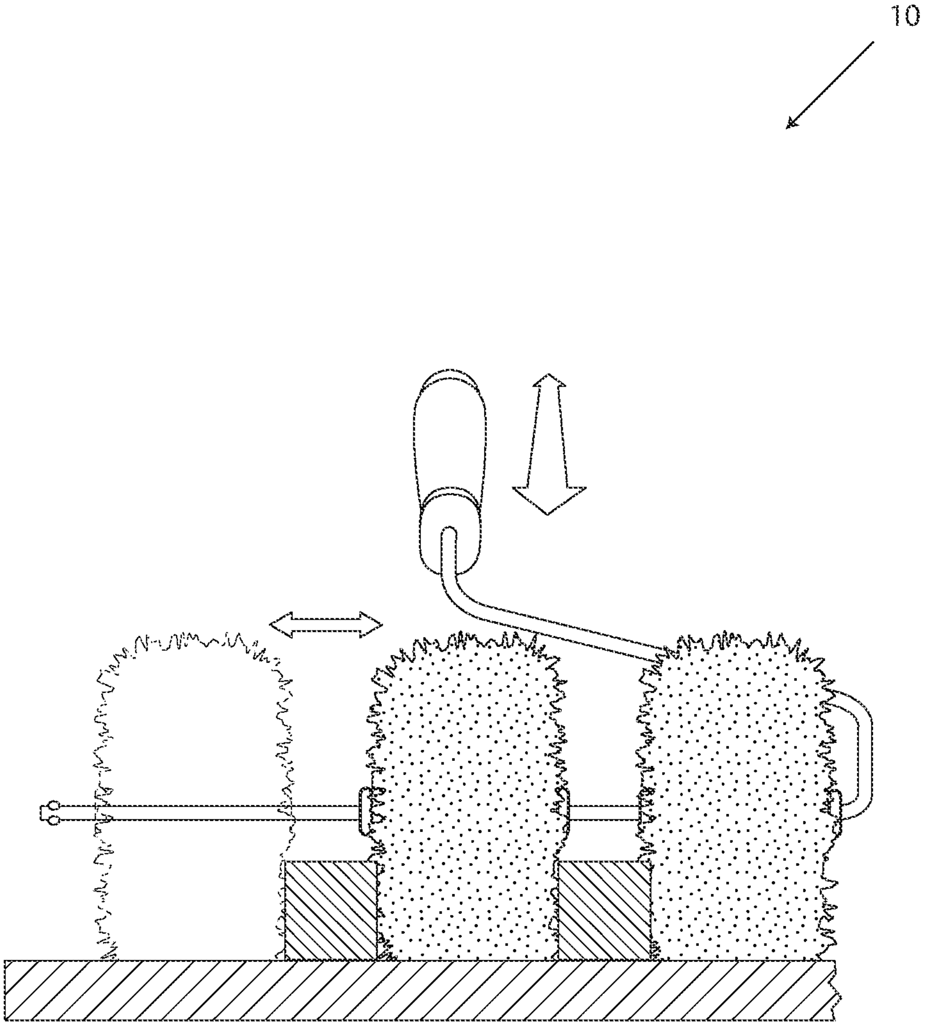

The invention will now be described with reference to the drawings wherein:

FIG. 1 of the drawings is a perspective view of a first embodiment of a liquid applicator apparatus manufactured in accordance with the present invention;

FIG. 2 of the drawings is a front view of the liquid applicator apparatus of FIG. 1 shown in association with a nonplanar surface (e.g., tongue and groove construction);

FIG. 3 of the drawings is a front view of the liquid applicator apparatus of FIG. 1 shown in association with a noncontinuous surface (e.g., planar deck with gaps/seams);

FIG. 4 of the drawings is a perspective view of a first embodiment of the liquid applicator apparatus manufactured in accordance with the present invention, showing a user simultaneously applying liquid to a plurality of surfaces of a deck;

FIG. 5 of the drawings is a perspective view of a second embodiment of a liquid applicator apparatus manufactured in accordance with the present invention;

FIG. 6 of the drawings is a front view of the liquid applicator apparatus of FIG. 5 shown in association with a nonplanar surface (e.g., board and batten construction);

FIG. 7 of the drawings is a front view of the liquid applicator apparatus of FIG. 5 shown in association with a nonplanar surface (e.g., board and batten construction);

FIG. 8 of the drawings is a perspective view of a third embodiment of a liquid applicator apparatus manufactured in accordance with the present invention;

FIG. 9 of the drawings is a front view of the liquid applicator apparatus of FIG. 8 shown in association with a nonplanar surface (e.g., shiplap construction); and FIG. 10 of the drawings is a front view of the liquid applicator apparatus of FIG. 8 shown in association with a nonplanar surface (e.g., coffered or slat construction).

DETAILED DESCRIPTION OF THE INVENTION

While this invention is susceptible of embodiment in many different forms and applications, there are shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of one or more embodiments of the invention, and some of the components may have been distorted from their actual scale for purposes of pictorial clarity.

Referring now to the drawings, and to FIGS. 1-4 in particular, a first embodiment of liquid applicator apparatus 10 is shown as generally comprising handle member 12, applicator retaining member 14, first liquid applicator 16, and second liquid applicator 18.

In accordance with the present invention, liquid applicator apparatus 10 enables a user to simultaneously apply a liquid to a plurality of noncontinuous (e.g., decks, segmented concrete, etcetera) and/or nonplanar surfaces (e.g., shiplap, Dutch lap, numerous types of siding, board and batten surfaces, brick and mortar surfaces, etcetera), that are ordinarily difficult to reach, in a fast and convenient manner. These surfaces may comprise horizontal surfaces, vertical surfaces and/or angled surfaces.

Handle member 12 of liquid applicator apparatus 10 preferably includes top end 20, bottom end 22, and gripping region 24. Gripping region 24 is adapted to be gripped by the hand of a user during normal use and/or transportation. Furthermore, bottom end 22 of handle member 12 is preferably adapted for releasable securement to extension pole 26 using, for example, a universally available threaded adapter and/or female receiver for enabling user 28 to apply liquid 30 to surface 32 while standing upright (See FIG. 4), thus minimizing the user's pain, discomfort, and fatigue.

In a preferred embodiment of the present invention, handle member 12 is fabricated from a material selected from the group consisting of a metal, a metal alloy, a natural resin, a synthetic resin, a plastic, a composite, and/or wood.

Applicator retaining member 14 of liquid applicator apparatus 10 preferably includes main portion 34, offset portion 36, spacer portion 38, and mounting portion 40 having proximal end and distal end 42 and 44, respectively. Preferably, applicator retaining member 14 is releasably secured to handle member 12 so that the components can be independently cleaned when necessary or desired by the user. It will be understood that applicator retaining member 14 may comprise a single rod or a plurality of rods that form a cage configuration (See FIG. 8).

Applicator retaining member 14 is adapted to both releasably retain a plurality (e.g., two or more, three or more, 2, 3, 4, 5, 6, 7, 8, 9, 10, 20, 50, 100, etcetera) of liquid applicators, and separate the applicators from the handle member during normal use. It will be understood that applicator retaining member 14 may alternatively comprise a linear rod, an L-shaped rod, an offset L-shaped rod, a T-shaped rod—just to name a few. The number of liquid applicators on the retaining member is only limited in number by the length of the retaining member and the lateral thickness of each liquid applicator and any lateral protrusions from the applicators, such as the holding grommets.

In a preferred embodiment of the present invention, applicator retaining member 14 is fabricated from a material selected from the group consisting of a metal, a metal alloy, a natural resin, a synthetic resin, a plastic, a composite, and/or wood.

In accordance with the present invention, liquid applicator apparatus 10 includes a plurality (e.g., two or more, three or more, 2, 3, 4, 5, 6, 7, 8, 9, 10, 20, 50, 100, etcetera) of liquid applicators. These applicators enable a user to apply liquid (e.g., paints, stains, varnishes, primers, sealants, adhesives, caulks, coatings, texture modifiers, etcetera) to noncontinuous (e.g., decks, segmented concrete, etcetera) and/or nonplanar surfaces (e.g., shiplap, Dutch lap, numerous types of siding, board and batten surfaces, brick and mortar surfaces, etcetera), that are ordinarily difficult to reach, in a fast and convenient manner. Indeed, the liquid applicator apparatuses of the present invention dramatically reduce the time it takes to, for example, stain a deck and/or paint shiplap on a wall. When used with an extension pole, it also allows a user to paint while standing up—thus saving a user from undesirable fatigue, pain and strain to his/her knees, neck, back and/or joints.

In one embodiment of the present invention, first liquid applicator 16 and second liquid applicator 18 are positioned on mounting portion 40 of applicator retaining member 14. The liquid applicators are preferably free to rotate about applicator retaining member 14.

Preferably, one or both of first liquid applicator 16 and second liquid applicator 18 are adjustable between proximal end 42 and distal end 44 of mounting portion 40 of applicator retaining member 14. This allows the user to quickly change the spacing between the applicators so that the applicators apply liquid to the appropriate portion of the surface being, for example, painted.

In accordance with the present invention, the liquid applicators are adjustably secured to the mounting portion of the applicator retaining member by use of several tight-fitting but adjustable sliding rubber grommets 46, one on either side of each liquid applicator. It will be understood, however, that other adjustment means are likewise contemplated for use in the present invention, including, for example, stop members, clips, O-rings, spacers, washers 47 (See FIG. 8), protrusions 49 (See FIG. 8), fasteners, springs, and/or any other components or mechanism that allows the user to controllably adjust the position of the applicators on the applicator retaining member.

In a preferred embodiment of the present invention, the liquid applicators are fabricated from a material selected from the group consisting of a natural or synthetic sponge, cotton, wool, a natural resin, a synthetic resin, a plastic, a foam, and/or a composite of any of the aforementioned materials. In further accordance with the present invention, the liquid applicators may comprise polyester knit rollers, soft woven rollers, wool and polyester knit rollers, microfiber rollers, foam rollers, merino sheepskin rollers, mohair rollers, no nap foam rollers, ¼-inch nap rollers, ⅜-inch nap rollers, ¾-inch nap rollers, 1-inch nap rollers, 1½-inch nap rollers, mini paint rollers, 3-inch trim rollers, 9-inch rollers, 12-inch rollers, etcetera.

As is best shown in FIG. 2, in one embodiment, first liquid applicator 16 and second liquid applicator 18 include outwardly canted surfaces 48 that enable a user to controllably apply a liquid to a subjacent portion of a nonplanar surface. As is best shown in FIG. 3, this configuration also enables a user to controllably apply a liquid to a noncontinuous surface, such as a deck.

Referring now to FIGS. 5-7, a second embodiment of liquid applicator apparatus 10 is shown as generally comprising handle member 12, applicator retaining member 14, first liquid applicator 16, and second liquid applicator 18. In this embodiment, first liquid applicator 16 and second liquid applicator 18 include inwardly canted surfaces 50 that enable a user to controllably apply a liquid to a superjacent portions of a nonplanar surface and limited portions of the primary and/or planar portion of the surface (See FIG. 6).

Referring now to FIGS. 8-10, a third embodiment of liquid applicator apparatus 10 is shown as generally comprising handle member 12, applicator retaining member 14, first liquid applicator 16, and second liquid applicator 18. In this embodiment, first liquid applicator 16 and second liquid applicator 18 include nap rollers 52 that enable a user to controllably apply a liquid to a subjacent portions of a nonplanar surface (shiplap) and limited portions of the primary and/or planar portion of the surface (See FIG. 9). As is best shown in FIG. 10, this configuration is also adapted for quickly staining or painting coffered or slat construction in a fraction of the time compared to a hand brush and/or conventional roller.

The foregoing description merely explains and illustrates the invention and the invention is not limited thereto except insofar as the appended claims are so limited, as those skilled in the art who have the disclosure before them will be able to make modifications without departing from the scope of the invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed and desired to be secured by Letters Patent of the United States is:

1. A liquid applicator apparatus that allows for fast, convenient, and simultaneous application of a liquid to a plurality of surfaces, comprising:
- a handle member;
- an applicator retaining member, wherein the applicator retaining member includes a main portion, an offset portion, a spacer portion, and a mounting portion having a proximal end and a distal end;
- a first liquid applicator;
- a second liquid applicator, wherein the first liquid applicator and the second liquid applicator are positioned on the mounting portion of the applicator retaining member; and
- a rubber grommet, wherein the rubber grommet contacts the mounting portion of the applicator retaining member and is positioned between the first liquid applicator and the second liquid applicator.

2. The liquid applicator apparatus according to claim 1, wherein the first liquid applicator and second liquid applicator are adapted to enable a user to simultaneously apply a liquid to noncontinuous and/or nonplanar surfaces, that are ordinarily difficult to reach, in a fast and convenient manner.

3. The liquid applicator apparatus according to claim 1, wherein the handle member includes a top end, a bottom end, and a gripping region positioned therebetween.

4. The liquid applicator apparatus according to claim 3, wherein the bottom end of the handle member is adapted for releasable securement to an extension pole for enabling a user to apply liquid to a surface while standing upright.

5. The liquid applicator apparatus according to claim 1, wherein the applicator retaining member is secured to the handle member.

6. The liquid applicator apparatus according to claim 1, wherein the first liquid applicator and the second liquid applicator are rotatably displaceable about the applicator retaining member.

7. The liquid applicator apparatus according to claim 1, wherein at least one of the first liquid applicator and the second liquid applicator are adjustable between the proximal end and the distal end of the applicator retaining member.

8. The liquid applicator apparatus according to claim 1, wherein the first liquid applicator and the second liquid applicator are adjustable between the proximal end and the distal end of the applicator retaining member.

9. The liquid applicator apparatus according to claim 1, wherein the first liquid applicator and second liquid applicator are adapted to enable a user to simultaneously apply a liquid to a noncontinuous surface and a subjacent portion of a nonplanar surface.

10. A liquid applicator apparatus that allows for fast, convenient, and simultaneous application of a liquid to a plurality of surfaces, comprising:
- a handle member, wherein the handle member includes a top end, a bottom end, and a gripping region positioned therebetween, and wherein the bottom end of the handle member is adapted for releasable securement to an extension pole for enabling a user to apply liquid to a surface while standing upright;
- an applicator retaining member, wherein the applicator retaining member includes a main portion, an offset portion, a spacer portion, and a mounting portion having a proximal end and a distal end and wherein the applicator retaining member is secured to the handle member;
- a first liquid applicator;
- a second liquid applicator;
- wherein the first liquid applicator and the second liquid applicator are positioned on the mounting portion of the applicator retaining member;
- a rubber grommet, wherein the rubber grommet contacts the mounting portion of the applicator retaining member and is positioned between the first liquid applicator and the second liquid applicator;
- wherein the first liquid applicator and second liquid applicator are adapted to enable a user to simultaneously apply a liquid to noncontinuous and/or nonplanar surfaces, that are ordinarily difficult to reach, in a fast and convenient manner;
- wherein the first liquid applicator and the second liquid applicator are rotatably displaceable about the applicator retaining member;
- wherein the first liquid applicator and the second liquid applicator are adjustable between the proximal end and the distal end of the applicator retaining member; and
- wherein the first liquid applicator and second liquid applicator are adapted to enable a user to simultaneously apply a liquid to a noncontinuous surface and a subjacent portion of a nonplanar surface.

11. A liquid applicator apparatus that allows for fast, convenient, and simultaneous application of a liquid to a plurality of surfaces, consisting of:

a handle member, wherein the handle member consists of a top end, a bottom end, and a gripping region positioned therebetween, and wherein the bottom end of the handle member is adapted for releasable securement to an extension pole for enabling a user to apply liquid to a surface while standing upright;

an applicator retaining member, wherein the applicator retaining member consists of a main portion, an offset portion, a spacer portion, and a mounting portion having a proximal end and a distal end and wherein the applicator retaining member is secured to the handle member;

a first liquid applicator;

a second liquid applicator;

wherein the first liquid applicator and the second liquid applicator are positioned on the mounting portion of the applicator retaining member;

a rubber grommet, wherein the rubber grommet contacts the mounting portion of the applicator retaining member and is positioned between the first liquid applicator and the second liquid applicator;

wherein the first liquid applicator and second liquid applicator are adapted to enable a user to simultaneously apply a liquid to noncontinuous and/or nonplanar surfaces, that are ordinarily difficult to reach, in a fast and convenient manner;

wherein the first liquid applicator and the second liquid applicator are rotatably displaceable about the applicator retaining member;

wherein the first liquid applicator and the second liquid applicator are adjustable between the proximal end and the distal end of the applicator retaining member; and wherein the first liquid applicator and second liquid applicator are adapted to enable a user to simultaneously apply a liquid to a noncontinuous surface and a subjacent portion of a nonplanar surface.

* * * * *